United States Patent
Pelzer

(10) Patent No.: US 6,299,961 B1
(45) Date of Patent: Oct. 9, 2001

(54) RECYCLABLE TEXTILE FLOOR COVERINGS WITH POLYALKYLENE FILM SEPARATION LAYER

(75) Inventor: Helmut Pelzer, Witten (DE)

(73) Assignee: HP-Chemie Pelzer Research and Development Ltd., Waterford (IE)

( * ) Notice: Subject to any disclaimer, the term of this patent is extended or adjusted under 35 U.S.C. 154(b) by 0 days.

(21) Appl. No.: 08/849,991

(22) PCT Filed: Dec. 9, 1995

(86) PCT No.: PCT/EP95/04856
  § 371 Date: Dec. 3, 1997
  § 102(e) Date: Dec. 3, 1997

(87) PCT Pub. No.: WO96/18766
  PCT Pub. Date: Jun. 20, 1996

(30) Foreign Application Priority Data

Dec. 13, 1994 (DE) ................................................ 44 44 290
Mar. 4, 1995 (DE) ................................................ 195 07 591

(51) Int. Cl.⁷ .................................................... B32B 7/06
(52) U.S. Cl. ............................................. 428/95; 428/198
(58) Field of Search ............................... 428/85, 95, 198; 156/78, 196, 242

(56) References Cited

U.S. PATENT DOCUMENTS

| | | | | |
|---|---|---|---|---|
| 3,990,929 | * | 11/1976 | Evans ...................... | 156/71 |
| 4,075,377 | * | 2/1978 | Aitchison et al. ........ | 428/95 |
| 4,242,389 | * | 12/1980 | Howell ..................... | 428/40 |
| 4,405,668 | * | 9/1983 | Wald ........................ | 428/40 |
| 4,824,498 | * | 4/1989 | Goodwin et al. ......... | 428/95 |
| 5,370,757 | * | 12/1994 | Corbin et al. ............ | 156/72 |
| 5,409,648 | | 4/1995 | Reidel . | |

FOREIGN PATENT DOCUMENTS

| | | |
|---|---|---|
| 24 35 510 A1 | 11/1975 | (DE) . |
| G 91 13 755.1 | 4/1992 | (DE) . |
| G 92 08 297.1 | 12/1992 | (DE) . |
| 52 22 023 A1 | 1/1994 | (DE) . |
| G 92 13 804.7 | 3/1994 | (DE) . |
| 0 268 875 | 6/1988 | (EP) . |
| 1 376 262 | 12/1974 | (GB) . |
| 1 503 542 | 3/1978 | (GB) . |
| 2 228 675 A | 9/1990 | (GB) . |
| 9-76384 | * 3/1995 | (JP) . |
| WO 93/00216 | 1/1993 | (WO) . |
| WO 93/11927 | 6/1993 | (WO) . |
| WO 94/01278 | 1/1994 | (WO) . |

OTHER PUBLICATIONS

Laser Jueger, "Recycling–Moglichkeiten von Teppich–Kompaktsystemen fur das Automobil," Melliand Textilberichte Mar. 1993, pp. 205–207.

* cited by examiner

*Primary Examiner*—Cheryl Juska
(74) *Attorney, Agent, or Firm*—Banner & Witcoff, Ltd.

(57) ABSTRACT

The invention relates to recyclable textile floor coverings for motor vehicles with a multi-layer structure and processes for their preparation. In particular, recyclable textile floor coverings for motor vehicles with a multi-layer structure include a foam layer, a separation layer, a heavy layer, and a textile carpet, wherein the adhesiveness of the separation layer with respect to the heavy layer is different than the adhesiveness of the separation layer with respect to the foam layer. In another embodiment, the separation layer is separably bonded to the heavy layer by spot bonding and/or is separably bonded to the foam layer by spot bonding. The separation layer allows separate recycling of the foam layer on one hand and the textile carpet including the heavy layer on the other hand.

1 Claim, 1 Drawing Sheet

RECYCLABLE TEXTILE FLOOR COVERINGS WITH POLYALKYLENE FILM SEPARATION LAYER

FIELD OF THE INVENTION

The invention relates to recyclable textile floor coverings for motor vehicles with a multi-layer structure and processes for their preparation.

BACKGROUND OF THE INVENTION

Textile floor covering in motor vehicles are known per se. They are usually prepared by initially forming a textile floor layer in a matrix form of the floor panel of the motor vehicle. Due to the transmission tunnel or due to elevations and cavities on the floor panel, there are differences in height ranging from a few millimeters to some centimeters.

Usually, velours or needle felt carpets which are coated on the backside are used. The carpets in high-quality cars are supplied with a so-called heavy layer to improve the sound insulation. This may be, for instance, an EPDM sheet containing up to 70% by weight of a filler.

The thus obtained laminate of backside coated carpet and heavy layer is usually subjected to shaping.

In the prior art, in order to equilibrate the unevenness of the floor panel and for sound absorption, an absorption foam back is placed on the above mentioned laminate by the back injection process. Particularly, it is preferred in the prior art to use a filled two-component polyurethane foam (heavy foam) which is injected into the mold. This polyurethane foam is acoustically effective in combination with the heavy layer.

WO 93/11927 pertains to large-area lining parts made of thermo-plastics for motor vehicle inside use or equivalent applications, wherein the carrier consists of polyolefin particle foams, onto which a decorative layer of mainly polyolefinic polymers consisting of a multi-layer knitted or woven fabric with knitted-in spacers of preferably polyolefinic polymer threads is backed during the molding process, the carrier has a decorative textile surface, or is laminated on its upper side with a decoratively designed sheet, mainly based on olefinic polymers, or in addition is laminated on the backside with a polyolefin sheet. As used in the present document, "lining parts for motor vehicle inside uses" means in particular side parts of doors, inside roof linings (finished inside roofs), seat back linings, hat racks, and side linings made of thermoplastics.

WO 93/00216 pertains to a process for the preparation of multi-layer molded parts by injection-backing of an essentially flexible laminate (16) consisting of a sheet-like surface material (19), such as leather or textile fabric, backed with a foam layer (22). Before injecting the laminate into the mold, a separation layer (18) is applied to the foam surface. The separation layer consists of a release agent containing a mixture of an aqueous rubber dispersion and an aqueous silicone emulsion.

From WO 94/01278 and the prior art mentioned therein, a process has been known for the preparation of textile floor coverings for motor vehicles by (a) wiper blade coating a mixture of foam off-cuts and a self-curing binder (absorption foam) 2 in a matrix form of the floor panel 1 of the motor vehicle in a desired layer thickness profile;

(b) applying by pressing the optionally premolded textile carpet 4 provided with a heavy layer 3 on the mixture of foam off-cuts and self-curing binder 2 while adjusting the desired density of the foam off-cuts;

(c) activating the binder; and (d) bonding the mixture of foam off-cuts and self-curing binder 2 to the heavy layer 3 of the textile carpet. By the teaching of this document, a uniform density distribution throughout the volume of the backside absorption foam 2 can be achieved.

However, when recycling such textile floor coverings, a severe problem arises from the layers employed being bonded together unseparably, thus only multicomponent mixtures being available for the reuse. In principle, however, the textile floor coverings bonded to the heavy layer, on one hand, and the foam backing, on the other hand, could be passed to excellent possible reuses after separation thereof.

Accordingly, the problem of the present invention is to provide recyclable textile floor coverings for motor vehicles with a multi-layer structure which can be subjected to an economically useful separation of their individual component layers when the motor vehicle is no longer used. It is not important here to completely separate all existing layers but rather to separate layers once or twice in an economically useful manner.

SUMMARY OF THE INVENTION

In a first embodiment of the present invention, the above problem is solved by recyclable textile floor coverings 1 for motor vehicles with a multi-layer structure consisting of a) a foam layer 2;

b) a separation layer 5;

c) a heavy layer 3; and d) a textile carpet 4;

wherein the adhesiveness of said separation layer 5 with respect to said heavy layer 3 is lower than the adhesiveness of said separation layer 5 with respect to said foam layer 2.

In a second embodiment, the above problem is solved by recyclable textile floor coverings 1 for motor vehicles with a multi-layer structure consisting of a) a foam layer 2;

b) a separation layer 5;

c) a heavy layer 3; and d) a textile carpet 4;

wherein the adhesiveness of said separation layer 5 with respect to said heavy layer 3 is higher than the adhesiveness of said separation layer 5 with respect to said foam layer 2.

In a third embodiment of the present invention, the above problem is solved by separable multi-layer textile floor coverings 1 for motor vehicles consisting of a) a foam layer 2;

b) a heavy layer 3;

c) a textile carpet 4; and d) a separation layer 5;

wherein said separation layer 5 is separably bonded to said heavy layer 3 by spot bonding and/or is separably bonded to said foam layer 2 by spot bonding.

Thus, it is possible with the present invention to separate, when the motor vehicle is no longer used, the foam layer 2 from the heavy layer 3 which itself remains tightly bonded to the textile carpet 4 and to respectively pass them to separate uses.

DETAILED DESCRIPTION OF THE INVENTION

Figure 1:
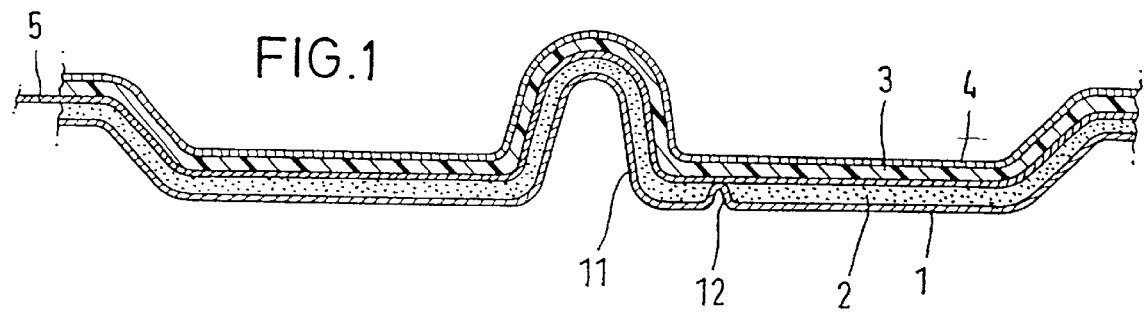
FIG. 1 is a sectional view of a floor panel of a motor vehicle.

FIG. 1 shows a matrix form shape of a floor panel 1 of a motor vehicle. Transmission tunnel 11 and cable channel 12 protrude from the otherwise even mold. Whereas cable channel 12 is not visible from the upper side of the foam layer 2 and self-curing binder, transmission tunnel 11 is covered by the foam layer 2 with constant layer thickness.

Between foam layer 2 and heavy layer 3, there is a separation layer 5 which, according to the first and second embodiments, has a different adhesiveness with respect to either foam layer 2 and heavy layer 3 due to the materials and/or manufacturing processes of said layers being different. Heavy layer 3 itself is tightly bonded to the textile carpet 4.

Figure 2:
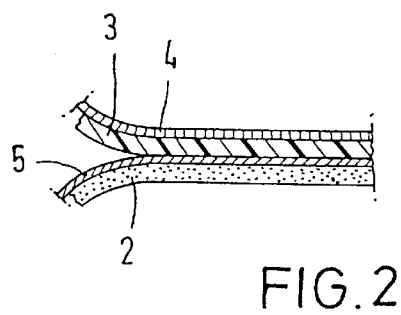
FIG. 2 is a sectional view of a first embodiment of the recyclable textile floor covering according to the invention.
Figure 3:
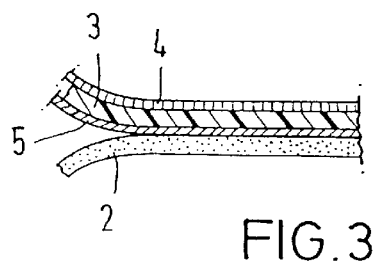
FIG. 3 is a sectional view of a second embodiment of the recyclable textile floor covering according to the invention.

According to the third embodiment, separation layer 5 is only spot-bonded to heavy layer 5 and/or foam layer 2 such that a separation of these layers by breaking is possible as illustrated in FIGS. 2 and 3.

It is particularly preferred that foam layer 2 consist of recycled foam off-cuts which have been recovered, for example, as residuary materials from manufacturing other objects. Accordingly, in a preferred embodiment of the present invention, a mixture of from 70 to 99% by volume of foam off-cuts and from 1 to 30% by volume of binder(s) is employed as the foam layer. In another preferred embodiment of the present invention, the mixture of the foam layer consists of from 75 to 90% by volume of foam off-cuts and from 10 to 25% by volume of binder(s).

The size of the foam off-cuts is of minor importance, it should not, however, exceed the smallest layer thickness of the absorption foam, for example, above the cable channel 12 since otherwise a sufficiently smooth surface for applying the textile carpet 4 is not provided. Accordingly, it is particularly preferred to employ foam off-cuts having a size of from 1 to 30 mm. Since usually the thickness of absorption foam 2 for the preparation of textile carpets 4 for motor vehicles is partially about 2 to 100 mm, particularly 5 to 80 mm, such selection of the size of foam off-cuts ensures that the elastic shape restoring forces of the foam off-cuts do not deteriorate the surface quality of the absorption foam 2.

The selection of the self-curing binder is practically unrestricted, as long as the binder is capable of sufficiently strong bonding of the foam off-cuts employed and has sufficient elasticity to be acoustically active. Furthermore, sufficient wetting of the foam off-cuts is necessary in order to create a strong compound. Also, good bonding to the heavy layer 3 must be possible.

Accordingly, in a preferred embodiment of the present invention, a phenol resin, a one-component polyurethane or a latex emulsion, optionally filled with polyolefin fibers, for instance, polypropylene fibers, is used as the binder.

In such mixtures of foam off-cuts and binder 2, the binder activities can be activated, for instance, by action of temperature, water vapor and/or pressure. This involves curing of the optionally thermoplastic elastic binder, resulting in an acoustically active absorption foam 2 with about the same density throughout its volume. Therefore, the sound absorption characteristics are essentially equal throughout the volume.

The (desired) adhesiveness and spot-bonding of the material of separation layer 5 with respect to the heavy layer 3 on one hand and the foam layer on the other hand essentially determine the applicability of a material. It is particularly preferred in the present invention to use a biaxially drawn polyalkylene sheet, in particular a polyethylene sheet, such as that used for packaging purposes.

In the present invention, a commercial EPDM sheet comprising up to 80%, especially 70%, per weight of fillers, for instance, can be applied as the heavy layer 3.

According to the present invention, it is possible to use heavy layers 3 having a lower quality than usual. For in several processes for the preparation of the recyclable textile floor coverings of the invention, connection of the foam layer 2 to the structure of the textile floor covering on top thereof through separation layer 5 is achieved by injection-backing heavy layer 3. When the usual heavy layers 3 without a separation layer 5 are used, this is frequently accompanied by penetrations of foam material into textile carpet 4 which is thereby ruined. By the present invention and in particular by incorporation of separation layer 5, such penetrations in the preparation of the recyclable textile floor coverings are avoided.

In the present invention, a velours or needle felt coated on the backside, which is known in the prior art, may be used as the textile carpet 4. Preferably, the laminate of velours or needle felt coated on the backside and heavy layer 3 is correspondingly premolded before contacting it with absorption foam 2. However, it is equally possible to perform the shaping of the textile carpet while bonded to absorption foam 2.

Several processes are possible for the preparation of the above defined recyclable textile floor coverings.

Accordingly, a first embodiment of the process for the preparation of recyclable textile floor coverings for motor vehicles is a process comprising a) wiper blade coating a mixture of foam off-cuts and a self-curing binder (absorption foam) 2 in a matrix form of the floor panel 1 of the motor vehicle in a desired layer thickness profile;

b) applying by pressing the optionally premolded textile carpet 4 provided with separation layer 5 and heavy layer 3 on the mixture of foam off-cuts and self-curing binder 2 while adjusting the desired density of the foam off-cuts;

c) activating the binder; and d) bonding the mixture of foam off-cuts and self-curing binder 2 to separation layer 5.

A second embodiment of the process is characterized by a) wiper blade coating a mixture of foam off-cuts and a self-curing binder (absorption foam) 2 in a matrix form of the floor panel 1 of the motor vehicle in a desired layer thickness profile;

b) applying by pressing separation layer 5 on the mixture of foam off-cuts and self-curing binder 2 while adjusting the desired density of the foam off-cuts;

c) activating the binder;

d) bonding the mixture of foam off-cuts and self-curing binder 2 to separation layer 5;

e) applying by pressing the optionally premolded textile carpet 4 provided with heavy layer 3 on separation layer 5; and f) bonding separation layer 5 to heavy layer 3.

The two above mentioned alternative processes have the essential advantage over the processes for the preparation of textile floor coverings for motor vehicles given in WO 94/01278, that foam layer 2 can be separated from heavy layer 3 when recycled after the motor vehicle is no longer used. Depending on whether the adhesiveness of separation layer 5 is lower or higher with respect to either of the other layers, separation layer 5 remains bonded to heavy layer 3 or foam layer 2.

Adjustment of the adhesiveness may be accomplished, in particular, through the order of bonding steps, through the adhesives employed, or otherwise.

FIG. 2 shows a first embodiment of the recyclable textile floor covering according to the invention where the adhesiveness of separation layer 5 with respect to heavy layer 3 is lower than the adhesiveness of separation layer 5 with respect to foam layer 2. When the layers are peeled, foam layer 2 remains bonded to separation layer 5.

FIG. 3 shows a second embodiment of the recyclable textile floor coverings for motor vehicles where the adhesiveness of separation layer 5 with respect to heavy layer 3 is higher than the adhesiveness of separation layer 5 with respect to foam layer 2. Here, when the layer structure is peeled, separation layer 5 remains bonded to heavy layer 3.

Then, the individual layers obtained in the two alternative embodiments can be separately recycled.

In addition to the two alternative embodiments for the preparation of textile floor coverings for motor vehicles by wiper blade coating a mixture of foam off-cuts and a self-curing binder 2, however, an inverse build-up process prevails in the prior art proceeding from a pre-molded textile carpet 4 which is backed in a per se known manner with a heavy layer 3. Whereas in the prior art, heavy layer 3 is foam-backed with a foam material according to per se known methods, another embodiment of the present invention is characterized in that a separation layer 5 is provided between heavy layer 3 and foam layer 2. Thus, it is possible in the present invention to use heavy layer 3 in a minor quality, i.e. especially having a higher degree of fillers, since separation layer 5 prevents penetration of foam material through heavy layer 3.

Accordingly, a further embodiment of the present invention consists in a process for the preparation of the above mentioned textile floor coverings which is characterized in that a) an optionally pre-molded textile carpet 4 is backed in a per se known manner with a heavy layer 3;

b) heavy layer 3 is bonded to a separation layer 5;

c) separation layer 5 is foam-backed with a foam material; and d) the textile floor covering is optionally shaped.

A third embodiment of the process for the preparation of said multi-layer textile floor coverings 1 for motor vehicles from a foam layer 2, a separation layer 5, a heavy layer 3 and a textile carpet 4 consists in a process comprising a) wiper blade coating a mixture of foam off-cuts and a self-curing binder (absorption foam) 2 in a matrix form of the floor panel 1 of the motor vehicle in a desired layer thickness profile;

b) applying by pressing a separation layer 5 on the mixture of foam off-cuts and self-curing binder 2 while adjusting the desired density of the foam off-cuts;

c) whole-area bonding of said mixture of foam off-cuts and self-curing binder 2 to separation layer 5 by activating said binder;

d) applying an adhesive in spots on separation layer 5 and/or heavy layer 3 which is optionally provided with a textile carpet 4;

e) spot-bonding separation layer 5 with heavy layer 3; and f) optionally providing heavy layer 3 with a textile carpet 4.

The above mentioned process has also the essential advantage over the processes for the preparation of textile floor coverings for motor vehicles given in WO 94/01278, that when recycled after the motor vehicle is no longer used, foam layer 2 can be separated from heavy layer 3 by means of separation layer 5 which can be respectively passed to appropriate reuses.

In addition to the above mentioned embodiment of the preparation of textile floor coverings for motor vehicles by wiper blade coating a mixture of foam off-cuts and a self-curing binder 2, however, an inverse build-up process prevails in the prior art. In analogy to the above described process variants, another embodiment of the present invention is characterized in that a separation layer 5 is first applied between heavy layer 3 and foam layer 2 and spot-bonded to said heavy layer 3. Thus, it is possible in the present invention to use heavy layer 3 in a minor quality, i.e. especially having a higher degree of fillers or a lower density, since separation layer 5 prevents penetration of foam material through heavy layer 3.

Accordingly, a further embodiment of the present invention consists in a process for the preparation of the separable multi-layer textile floor coverings 1 for motor vehicles by a) backing an optionally pre-molded textile carpet 4 in a per se known manner with a heavy layer 3;

b) applying a separation layer 5, which is optionally to be spot-bonded, to heavy layer 3 and bonding;

c) foam-backing separation layer 5 with a foam material 2; and d) optionally shaping the textile carpet 4.

Particularly preferred adhesives for whole-area bonding or in particular for spot-bonding heavy layer 3 and/or foam layer 2 to separation layer 5 are hot melt adhesives, optionally heat-activatable polyethylene adhesives, polyurethane adhesives, and/or latex emulsion adhesives.

Then, the individual layers obtainable according to the above embodiments can be passed to separate reuse.

What is claimed is:

1. Recyclable textile floor coverings for motor vehicles with a multi-layer structure comprising:

a) a foam layer;

b) a separation layer adjacent the foam layer in an overlying manner and adhesively secured to the foam layer;

c) a heavy layer adjacent the separation layer in an overlying manner and adhesively secured to the separation layer; and d) a textile carpet adjacent and bonded to the heavy layer in an overlying manner:

wherein the adhesiveness of said separation layer with respect to said heavy layer is different than the adhesiveness of said separation layer with respect to said foam layer so that said heavy layer and foam layer may be separated from each other, said separation layer being separably bonded to one of said heavy layer and said foam layer by spot bonding, and said separation layer is a biaxially drawn polyalkylene sheet.

* * * * *